(12) United States Patent
Chen

(10) Patent No.: US 10,019,385 B2
(45) Date of Patent: Jul. 10, 2018

(54) METHOD AND APPARATUS OF REAL-TIME RETIMER DELAY MEASUREMENT

(71) Applicant: INTEL CORPORATION, Santa Clara, CA (US)

(72) Inventor: Huimin Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 197 days.

(21) Appl. No.: 15/196,889

(22) Filed: Jun. 29, 2016

(65) Prior Publication Data

US 2018/0004686 A1 Jan. 4, 2018

(51) Int. Cl.
| | | |
|---|---|---|
| *G06F 13/10* | (2006.01) | |
| *G06F 13/16* | (2006.01) | |
| *G06F 13/20* | (2006.01) | |
| *G06F 13/42* | (2006.01) | |

(52) U.S. Cl.
CPC ............ *G06F 13/102* (2013.01); *G06F 13/16* (2013.01); *G06F 13/20* (2013.01); *G06F 13/4282* (2013.01); *G06F 2213/0042* (2013.01)

(58) Field of Classification Search
CPC ........ G06F 13/16; G06F 13/20; G06F 13/102; G06F 13/4282
See application file for complete search history.

(56) References Cited

U.S. PATENT DOCUMENTS

| | | | |
|---|---|---|---|
| 2003/0131301 A1* | 7/2003 | Shimono | ................ H04L 7/04 714/752 |
| 2008/0056426 A1* | 3/2008 | Si | .......... H03L 7/0814 375/373 |
| 2011/0051934 A1 | 3/2011 | Ikeda | |
| 2014/0126612 A1 | 5/2014 | Tresidder et al. | |
| 2015/0019921 A1 | 1/2015 | Chen et al. | |
| 2015/0227489 A1 | 8/2015 | Chen et al. | |
| 2017/0017604 A1* | 1/2017 | Chen | .................. G06F 13/4221 |
| 2017/0039162 A1* | 2/2017 | Mishra | .................. G06F 13/385 |

(Continued)

FOREIGN PATENT DOCUMENTS

WO    2011123415    10/2011

OTHER PUBLICATIONS

International Search Report and Written Opinion for International Patent Application No. PCT/US2017/033276, dated Aug. 28, 2017.

*Primary Examiner* — Nimesh G Patel
(74) *Attorney, Agent, or Firm* — Green, Howard & Mughal LLP

(57) ABSTRACT

Described is an apparatus comprising a first circuitry, a second circuitry, a third circuitry, and a fourth circuitry. The first circuitry may be an elastic buffer coupled to a received clock, a local clock, a received-clock data, and a local-clock data. The second circuitry may assert a first flag when a set of values on the received-clock data matches part of a skip ordered set. The third circuitry may assert a second flag when a set of values on the local-clock data matches part of the skip ordered set. The fourth circuitry may increment a count value upon assertion of the first flag and may stop incrementing the count value upon assertion of the second flag. In some embodiments, additional circuitries may extract a first timestamp from a packet, sum the first timestamp and the count value, and substitute the sum for the first timestamp within the packet.

20 Claims, 7 Drawing Sheets

(56) References Cited

U.S. PATENT DOCUMENTS

2017/0185502 A1\* 6/2017 Iyer ..................... G06F 11/3051
2017/0185547 A1\* 6/2017 McGowan ............. G06F 13/36
2017/0286359 A1\* 10/2017 McGowan .......... G06F 13/4291

\* cited by examiner

METHOD AND APPARATUS OF REAL-TIME RETIMER DELAY MEASUREMENT

BACKGROUND

Computer systems (e.g., desktop computers, laptop computers, workstations, and servers) commonly interact with a variety of peripheral devices. Some peripheral devices, such as keyboard, mice, and monitors, may facilitate routine use of computer systems. Computer systems may also interact with a plethora of other consumer devices, including printers, scanners, speakers, microphones, cameras, flash drives, external hard drives, projectors, smart phones, and tablets.

Interaction with peripheral devices may take place through interfaces based upon various interconnect technologies. Universal Serial Bus (USB) interfaces are used in a wide range of peripheral devices. Some USB interfaces may be compliant with the Universal Serial Bus 3.0 Specification (Nov. 12, 2008), the Universal Serial Bus 3.1 Specification (Jul. 26, 2013), or both.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
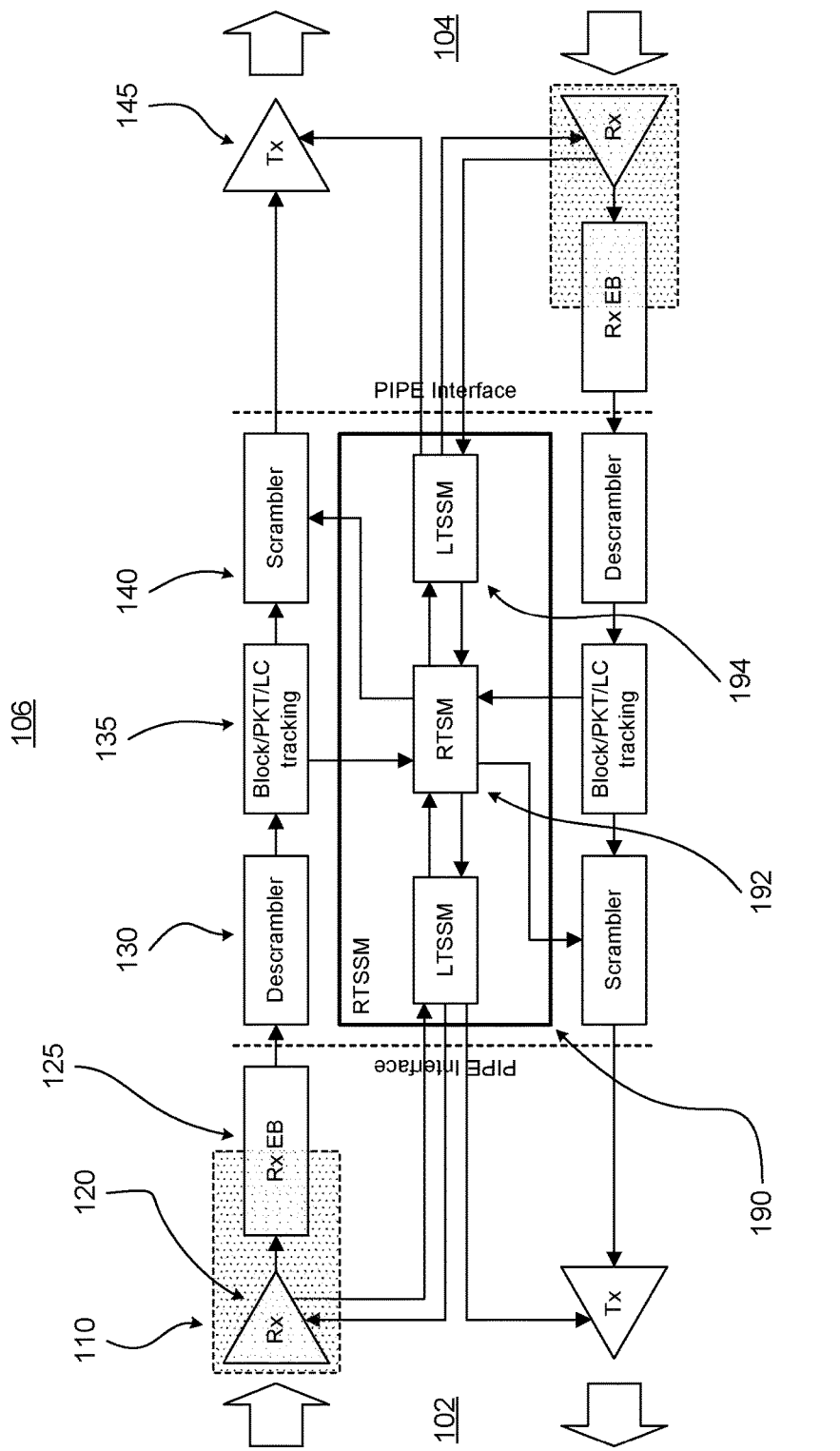
FIG. 1 illustrates a block diagram of a retimer, in accordance with some embodiments of the disclosure.

Computer systems (e.g., desktop computers, laptop computers, workstations, and servers) may interact through various interfaces with a variety of peripheral devices. Interfaces based upon various revisions of the Universal Serial Bus (USB) specification are widely-used in peripheral devices. Some USB interfaces may accommodate be compliant with the Universal Serial Bus 3.0 Specification (Nov. 12, 2008), the Universal Serial Bus 3.1 Specification (Jul. 26, 2013), or both.

As USB technology advances, such as with USB 3.0 technology and USB 3.1 technology, data rates associated with USB subsystems are correspondingly increasing. As frequencies increase to support the increased data rates, energy loss in the transmission channel (e.g., a USB cable) correspondingly increases. In effect, as frequencies increase, the transmission channel increasingly takes on the characteristics of a low-pass filter. The adoption of USB 3.1 technology (with data rates that are doubled compared to USB 3.0 technology), as well as the adoption of Type C connector technology (which may employ external cross multiplexing for lane orientation correction, and may thereby experience additional signal loss and distortion), may thus lead to signal attenuation due to increased channel loss and reduced routing distances.

Some USB 3.0 compliant cables and USB 3.1 compliant cables may be active cables comprising retimers. A retimer may be located approximately midway between two ends of a cable, and may actively repeat or replay signals travelling from each end of the cable to the other. In doing so, a retimer may increase signal quality so that the signals may ultimately travel further. By enhancing signal quality, a retimer may mitigate the effects of channel loss and signal attenuation at higher frequencies. This may in turn permit maintaining or extending routing distances in the presence of increased frequencies.

Unlike mere signal re-conditioning or boosting in an analog domain (such as in a redriver), a retimer may recover information travelling to it from one end of the cable, process the information in a digital domain, and send the information out toward the other end of the cable. While a redriver may incur almost no delays, a retimer may incur small delays. In some cases, the delays may be significant, and it may be advantageous to account for them.

For a USB 3.0 compliant or USB 3.1 compliant active cable comprising a retimer, a signal may be asserted to the cable at a first end, may propagate through a first side to the retimer, may be processed by the retimer, may be re-transmitted by the retimer, may propagate through a second side, and may be asserted by the cable at a second end. At various points throughout the cable, the signal may have substantially the same bandwidth. However, in the course of passing through and being processed by the retimer, the signal may transition from a clock domain corresponding with the first side to a local clock domain corresponding with the retimer and the second side.

The transition between these clock domains may incur a variable delay. Although this delay may be small, it may be advantageous to account for the delay in order to more accurately handle timestamp-bearing packets through the active cable. For example, it may be significant to account for the delay in handling an Isochronous Timestamp Packet (ITP) packet or a Link Delay Measurement (LDM) Response packet.

A USB host may transmit an ITP broadcast periodically with a global timestamp to endpoints of a USB hierarchy in order to establish a global or system-wide synchronization. A USB device, in order to calibrate the link delay, may transmit an LDM packet with a timestamp to a host, and the host may record the timestamp and transmit a Response to the LDM packet. The USB device may then calculate and use a round-trip processing delay to determine, for example, an amount of time for a packet to travel from the host to the device, which may be used to calibrate a timestamp in order to achieve more accurate synchronization between the device and the host.

In the event of an ITP packet or an LDM Response packet, a retimer may be disposed to adjusting a timestamp carried within the packet to account for the variable delay due to the transition between clock domains in the active cable. Synchronizing timestamps between a USB host and various USB devices may be advantageous for purposes of accommodating timestamp-sensitive applications, such as synchronized audio streams and synchronized video streams.

In addition to USB 3.0 compliant components and USB 3.1 compliant components, other interface technologies may also benefit from retimers operable to adjust timestamps carried within packets. As one example, a Peripheral Component Interconnect Express (PCIE) interface may benefit from such retimers. As another example, a Mobile Industry Processor Interface (MIPI) physical layer (PHY), such as a MIPI MPHY interface, may also benefit from such retimers.

Described herein are retimers comprising delay counters to determine delays associated with transitioning from one clock domain of the retimer to another. In some of the embodiments, a retimer may detect a first set of one or more predetermined values on a write-data input of an elastic buffer in a recovered clock domain. The first set of one or more predetermined values may be, for example, a USB 3.0-compliant or USB 3.1-compliant skip ordered set or, or part of a USB 3.0-compliant or USB 3.1-compliant skip ordered set. In some of the embodiments, the retimer may detect a second set of one or more predetermined on a read-data output of the elastic buffer in a local clock domain. The second set of one or more predetermined values may be, for example, a USB 3.0-compliant or USB 3.1-compliant skip ordered set or, or part of a USB 3.0-compliant or USB 3.1-compliant skip ordered set.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

FIG. 1 illustrates a block diagram of a retimer, in accordance with some embodiments of the disclosure. A retimer 100 may have an upstream side 102, a downstream side 104, a downstream datapath 106 operable to transmit traffic from upstream side 102 to downstream side 104, and an upstream datapath 108 operable to transmit traffic from downstream side 104 to upstream side 102.

Each of downstream datapath 106 and upstream datapath 108 may comprise a receiver (Rx) Analog Front End (AFE) 120, an elastic buffer 125, a descrambler 130, block/packet/line-code component 135, a scrambler 140, and/or a transmitter (Tx) AFE 145. In downstream datapath 106 and upstream datapath 108, Rx AFE 120 may receive a data stream (which may come from a USB 3.0 compliant and/or USB 3.1 compliant active cable in some embodiments). Rx AFE 120 may send its output to elastic buffer 125, which may send its own output to descrambler 130, which may in turn send its output to block/packet/line-code component 135, which may then send its output to scrambler 140, which may send its own output to Tx AFE 145. Tx AFE 145 may transmit a data stream to a downstream side of active cable.

Retimer 100 may also comprise a retimer training and status state machine (RTSSM) 190, which may in turn comprise a retimer state machine (RTSM) 192, a link training status and state machine (LTSSM) 194 corresponding with upstream side 102, and an LTSSM 194 corresponding with downstream side 104. Various elements of downstream datapath 106 and upstream datapath 108 (which may include Rx AFE 120, block/packet/line-code component 135, and/or scrambler 140) may interoperate with various elements of RTSSM 190 (which may include RTSM 192 and/or LTSSM 194) to receive, process, and transmit downstream and upstream traffic, respectively.

In each of downstream datapath 106 and upstream datapath 108, Rx AFE 120 and a portion of elastic buffer 125 may operate in a recovered clock domain 110, in which the clock is recovered from a received data stream. A remainder of the datapaths outside of recovered clock domain 110 (which may include Tx AFEs 145) may operate in a local clock domain based upon a locally-generated clock. A reminder of retimer 100 (which may include including RTSSM 190 and its components) may also operate in the local clock domain. Rx AFE 120 and the portion of elastic buffer 125 in recovered clock domain 110 may perform complete data recovery of an inbound data stream and may send the recovered data stream to various elements in the local clock domain (e.g., another portion of elastic buffer 125, descrambler 130, block/packet/line-code component 135, scrambler 140, and/or Tx AFE 145) for further processing and subsequent data transmission. Elastic buffer 125 may handle the clock-domain crossing for the datapath.

Figure 2:
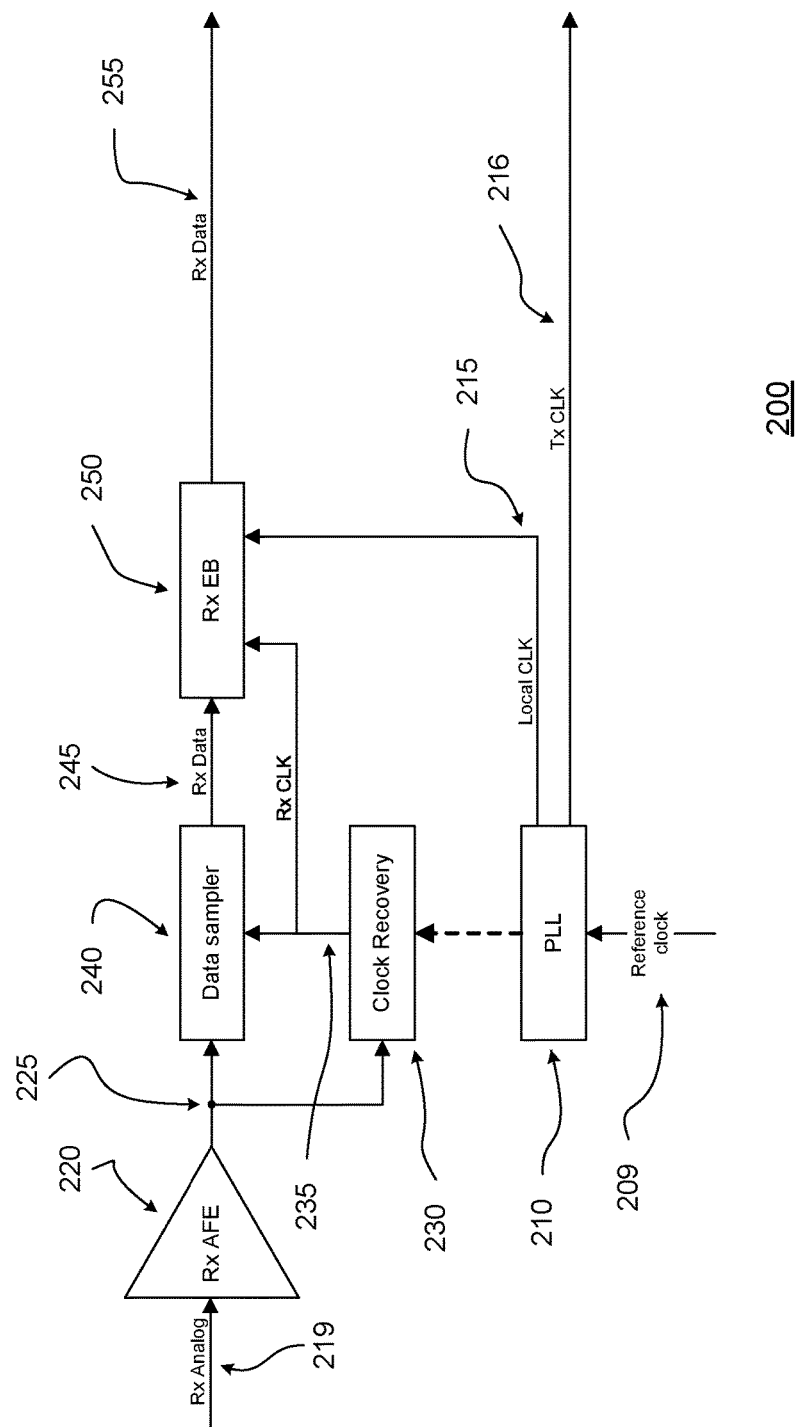
FIG. 2 illustrates a block diagram of a receiver portion of a retimer, in accordance with some embodiments of the disclosure.

FIG. 2 illustrates a block diagram of a receiver portion of a retimer, in accordance with some embodiments of the disclosure. A receiver portion 200 may comprise a Phase Locked Loop (PLL) circuitry 210, an Rx AFE circuitry 220, a clock recovery circuitry 230, a data sampler circuitry 240, and an elastic buffer circuitry 250.

Rx AFE circuitry 220 may receive an Rx data stream 219 (which may originate outside of the retimer) and may re-condition Rx data stream 219 to form local data stream 225. Rx AFE circuitry 220 may be substantially similar to Rx AFE 120. In some embodiments, Rx data stream 219 and/or local data stream 225 may be operable to carry data in a stream of serial bits. PLL circuitry 210 may drive a local clock 215 and a Tx clock 216 (which may be used, for example, by a Tx AFE of the retimer). PLL circuitry 210 may also supply clocking to clock recovery circuitry 230.

Based upon the clocking supplied by PLL circuitry 210, clock recovery circuitry 230 may be operable to recover a clock from local data stream 225 and may be operable to drive the recovered clock onto an Rx clock 235. Rx clock 235 may have substantially the same frequency as local clock 215, but may have a phase offset and/or frequency offset relative to local clock 215. Moreover, in some embodiments, the phase offset and/or frequency offset itself may vary over time.

Meanwhile, data sampler circuitry 240 may be operable to sample and recover data carried by local data stream 225. The sampled data may be converted from a stream of serial bits into a stream of parallel bits, which data sampler circuitry 240 may drive onto a received-clock data bus 245.

Elastic buffer circuitry 250 may sample the stream of parallel bits carried by received-clock data bus 245 based upon Rx clock 235. Elastic buffer circuitry 250 may also drive a stream of parallel bits onto a local-clock data bus 255 based upon local clock 215. Elastic buffer circuitry 250 may be substantially similar to elastic buffer 125.

Figure 3:
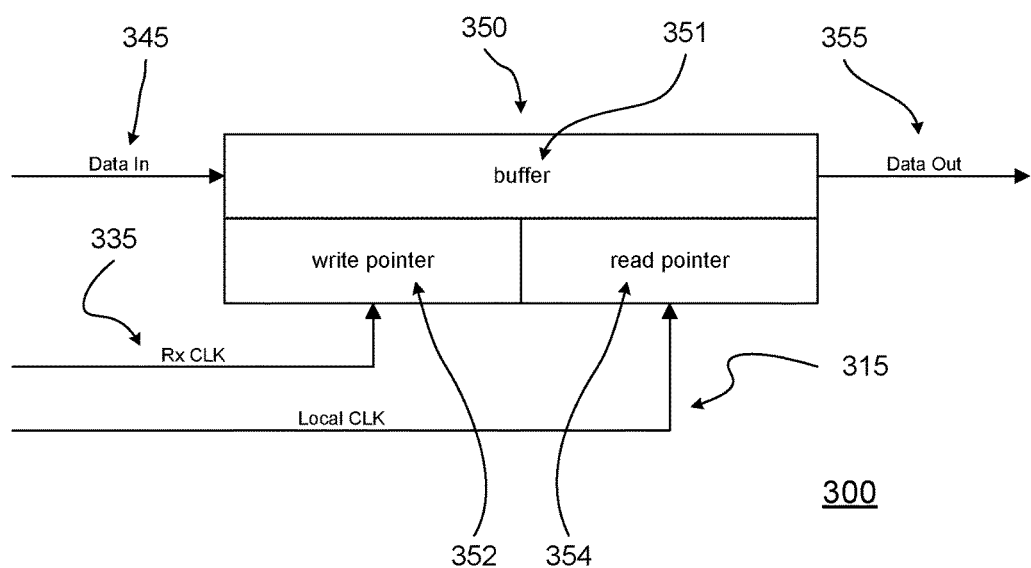
FIG. 3 illustrates a block diagram of an elastic buffer portion of a retimer, in accordance with some embodiments of the disclosure.

FIG. 3 illustrates a block diagram of an elastic buffer portion of a retimer, in accordance with some embodiments of the disclosure. An elastic buffer portion 300 may comprise an elastic buffer circuitry 350, which may sample a stream of bits carried on a data input 345 based upon a recovered clock 335. Elastic buffer circuitry 350 may also drive a stream of bits on a data output 355 based upon a local clock 315. Elastic buffer circuitry 350 may be substantially similar to elastic buffer circuitry 250.

Recovered clock 335 may be coupled to a write pointer circuitry 352 within elastic buffer circuitry 350. Data carried by data input 345 to elastic buffer circuitry 350 in the clock domain of recovered clock 335 may accordingly be written into and stored in a buffer 351 within elastic buffer circuitry 350, at an address indicated by write pointer circuitry 352.

Local clock 315 may be coupled to a read pointer circuitry 354 within elastic buffer circuitry 350. Data stored in elastic buffer circuitry 350 may be read from and recovered out of buffer 351 at an address indicated by read pointer circuitry 354 in the clock domain of local clock 315. Thereafter, the data read out of buffer 351 may be driven onto data output 355.

When operations begin, buffer 351 may be empty. As data carried by data input 345 is written into buffer 351 in the clock domain of recovered clock 335, buffer 351 may begin to fill. A write pointer maintained by write pointer circuitry 352 may indicate the fill status of buffer 351. In a half-full implementation, read operations may begin when buffer 351 is half full. For each read operation, a read pointer maintained by read pointer circuitry 354 may update when a read operation is performed. A difference between the write pointer and the read pointer may be monitored to manage the fill status of buffer 351.

If recovered clock 335 is exactly the same frequency as local clock 315, the difference between the write pointer and the read pointer may be substantially stable over time. If recovered clock 335 is faster than local clock 315, the write pointer may advance more quickly than the read pointer, and the difference between the write pointer and the read pointer may accordingly increase (which may trend toward a potential overflow condition for buffer 351). If recovered clock 335 is slower than local clock 315, the write pointer may advance more slowly than the read pointer, and the difference between the write pointer and the read pointer may accordingly decrease (which may trend toward a potential underflow condition for buffer 351).

To address potential overflow conditions, a transmitter originating the data carried by data input 345 may periodically insert skip ordered sets into the generated stream of data. A skip ordered set may be a series of symbols that may comprise an identifying symbol used to identify the beginning of the series, followed by a number of skip symbols (or dummy symbols). In operation, the skip symbols may be ignored as may be advantageous to make the difference between the write pointer and the read pointer be substantially stable over time.

For example, when the fill status of buffer 351 is trending to potentially overflow, elastic buffer 350 may refrain from writing one or more symbols of the skip ordered set into buffer 351. The write pointer may correspondingly refrain from advancing, while the read pointer may continue to advance, which may permit the difference between the two to decrease toward a predetermined condition chosen for the elastic buffer implementation (such as a half-full condition).

When the fill status of buffer 351 is trending to potentially underflow, elastic buffer 350 may refrain from reading the contents of buffer 351. The read pointer may correspondingly refrain from advancing while the write pointer may continue to advance, which may permit the difference between the two to increase toward a predetermined condition chosen for the elastic buffer implementation (such as a half-full condition). Instead of reading contents out of buffer 351, elastic buffer 350 may generate a skip ordered set locally, and may drive the locally-generated skip ordered set onto data output 355.

A transmitter originating the data carried by data input 345 (e.g., at a far end of the channel) may periodically insert skip ordered sets at a frequency defined by the protocol governing the transmitter (e.g., a USB protocol or a PCIE protocol). The governing protocol may establish a maximum frequency offset for elastic buffer 350 to accommodate, which may impact various design parameters of elastic buffer 350, such as a depth of buffer 351. For a fixed frequency offset, lower frequencies of skip ordered set insertion may correspond to larger depths of buffer 351, and higher frequencies of skip ordered set insertion may correspond to smaller depths of buffer 351.

Figure 4:
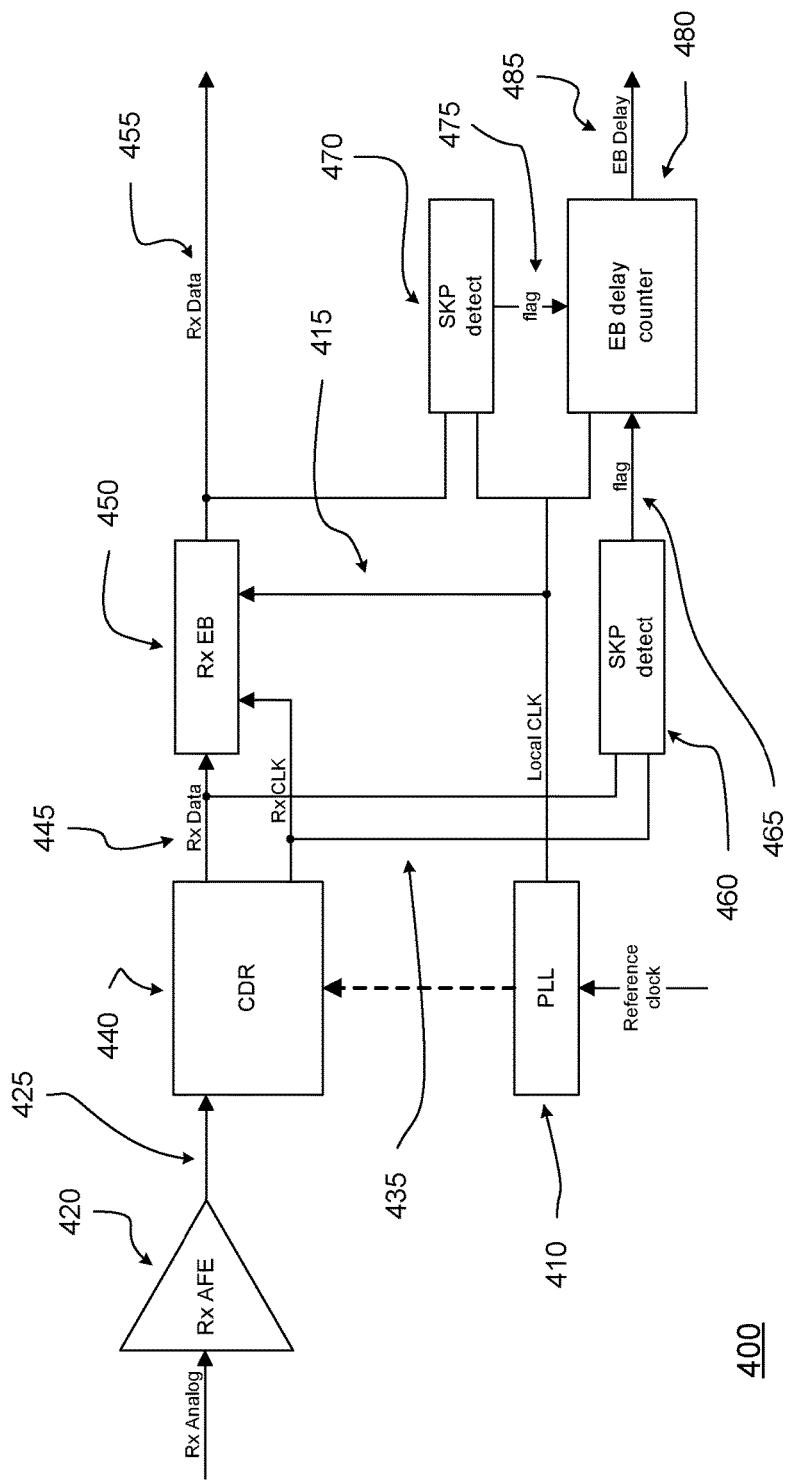
FIG. 4 illustrates a block diagram of a receiver portion of a retimer comprising circuitry for real-time delay measurement, in accordance with some embodiments of the disclosure.

FIG. 4 illustrates a block diagram of a receiver portion of a retimer comprising circuitry for real-time delay measurement, in accordance with some embodiments of the disclosure. A receiver portion 400 may comprise a PLL circuitry 410, an Rx AFE circuitry 420, a clock and data recovery circuitry 440, and an elastic buffer circuitry 450. Receiver portion 400 may additionally comprise a first flag circuitry 460, a second flag circuitry 470, and an elastic buffer delay counter circuitry 480. PLL circuitry 410 may be substantially similar to PLL circuitry 210, and may drive a local clock 415. Rx AFE circuitry 420 may be substantially similar to Rx AFE circuitry 220. Elastic buffer circuitry 450 may be sustainably similar to elastic buffer circuitry 250.

Rx AFE circuitry 420 may receive and re-condition an Rx data stream to form a local data stream 425. Clock and data recovery circuitry 440 may be operable to recover a clock from local data stream 425 based upon clocking supplied by PLL circuitry 410. Clock and data recovery circuitry 440 may then drive the recovered clock onto an Rx clock 435. Clock and data recovery circuitry 440 may also be operable to sample and recover data carried by local data stream 425. The sampled data may be converted from a stream of serial bits into a stream of parallel bits, which clock and data recovery circuitry 440 may drive onto a received-clock data bus 445.

Elastic buffer circuitry 450 may sample the stream of parallel bits carried by received-clock data bus 445 based upon Rx clock 435. Elastic buffer circuitry 450 may also drive a stream of parallel bits onto a local-clock data bus 455 based upon local clock 415.

First flag circuitry 460 may detect a skip ordered set passing across received-clock data bus 445 over a number of cycles of Rx clock 435. In some embodiments, first flag circuitry 460 may detect an identifying symbol used to identify the beginning of the skip ordered set, followed by a predetermined number of skip symbols, over a predetermined number of cycles of Rx clock 435. First flag circuitry 460 may accordingly detect a skip ordered set at an input of elastic buffer circuitry 450. Upon detecting a skip ordered set, first flag circuitry 460 may assert a flag 465. In some embodiments, first flag circuitry 460 may have a local clock input coupled to local clock 415, and flag 465 may be synchronized to the clock domain of local clock 415 (e.g., by a series of two flip-flops).

Second circuitry 470 may detect a skip ordered set passing across local-clock data bus 455 over a number of cycles of local clock 415. In some embodiments, second flag circuitry 470 may detect the identifying symbol, followed by the predetermined number of skip symbols, over a predetermined number of cycles of local clock 415. Second flag circuitry 470 may accordingly detect a skip ordered set at an output of elastic buffer circuitry 450. Upon detecting a skip ordered set, second flag circuitry 470 may assert a flag 475.

Elastic buffer delay counter circuitry 480 may comprise a counter, which may begin operation at a reset value (e.g., zero). The counter may remain at the reset value until an assertion of flag 465 is detected. Subsequently, the counter may increment on based upon clock cycles of local clock 415, and may accordingly count a number of clock cycles of local clock 415 from the assertion of flag 465. The counter may continue to increment until an assertion of flag 475 is detected, after which the counter may remain static. In some embodiments, the value on the counter may then be captured in a register and made ready for use as a measurement of delay through elastic buffer circuitry 450. The value on the counter (or, in some embodiments, a registered copy of the value on the counter) may then be driven onto a delay count 485 and may thereby be made available to other portions of the retimer.

Figure 5:
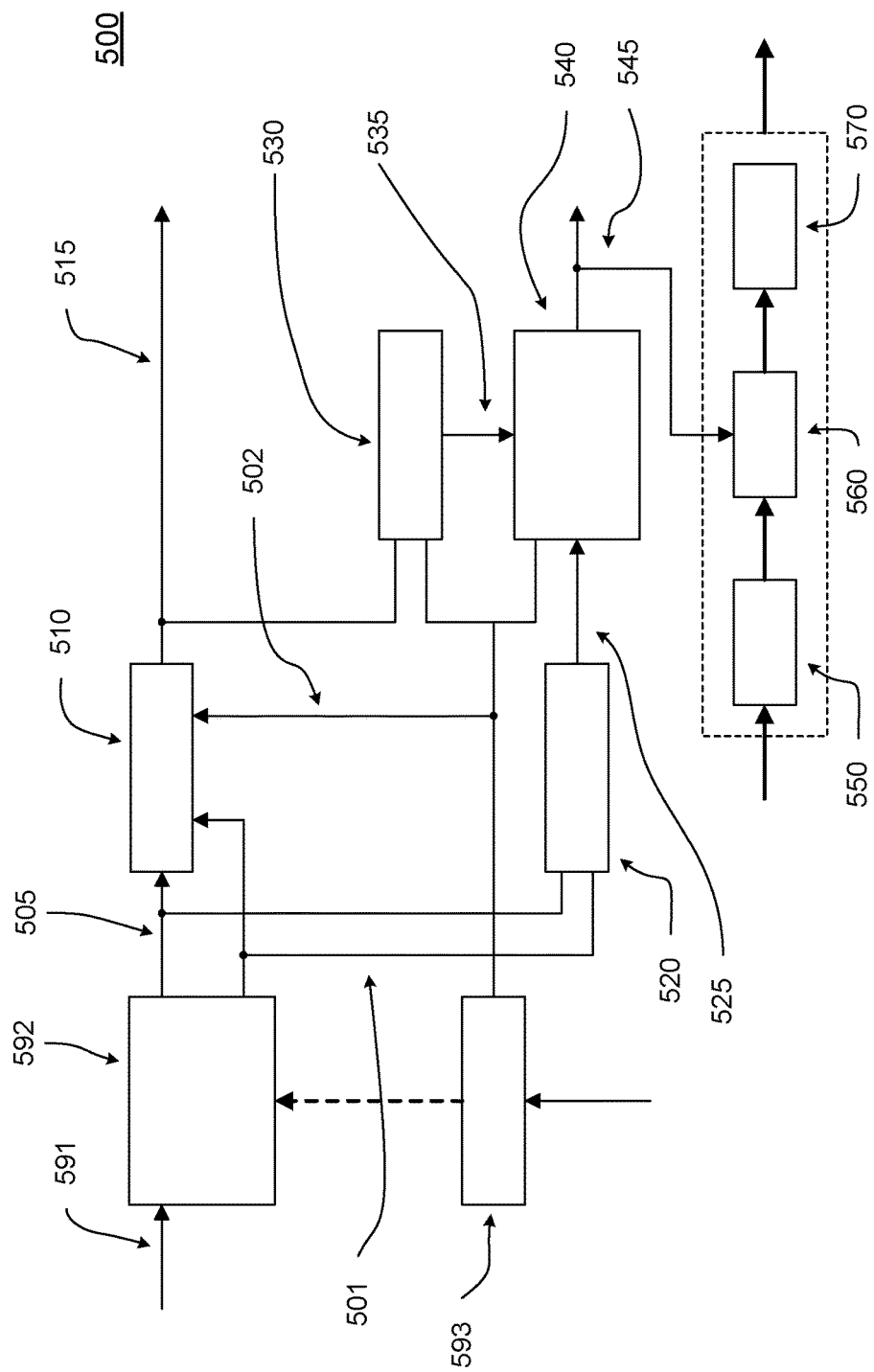
FIG. 5 illustrates a block diagram of portion of a retimer comprising circuitry for real-time delay measurement, in accordance with some embodiments of the disclosure.

FIG. 5 illustrates a block diagram of portion of a retimer comprising circuitry for real-time delay measurement, in accordance with some embodiments of the disclosure. Retimer portion 500 may comprise a first circuitry 510, a second circuitry 520, a third circuitry 530, and a fourth circuitry 540. First circuitry 510 may be substantially similar to elastic buffer circuitry 450, second circuitry 520 may be substantially similar to first flag circuitry 460, third circuitry 530 may be substantially similar to second flag circuitry 470, and fourth circuitry 540 may be substantially similar to elastic buffer delay counter circuitry 480.

First circuitry 510 may comprise a data input coupled to a first data path 505, a data output coupled to a second data path 515, a write-clock input coupled to a first clock path 501, and a read-clock input coupled to a second clock path 502. First clock path 501 may carry a recovered clock, which may be driven by a clock and data recovery circuitry 592, and may in turn be derived by clock and data recovery circuitry 592 from a serial-data path 591 received by the retimer. Second clock path 502 may carry a local clock, which may be driven by a PLL circuitry 593. In various embodiments, first circuitry 510 may comprise an elastic buffer.

Second circuitry 520 may comprise a data input coupled to first data path 505, a clock input coupled to first clock path 501, and a data output coupled to first flag 525. Second circuitry 520 may be operable to assert first flag 525 when a set of one or more values on first data path 505 matches a portion of a set of one or more predetermined values over a corresponding set of one or more cycles of a clock on first clock path 501. In some embodiments, second circuitry 520 may additionally comprise a circuitry to synchronize first flag 525 to a clock domain of the second clock path 502.

Third circuitry 530 may comprise a data input coupled to second data path 515, a clock input coupled to second clock path 502, and a data output coupled to second flag 535. Third circuitry 530 may be operable to assert second flag 535 when a set of one or more values on second data path 515 matches a portion of a set of one or more predetermined values over a corresponding set of one or more cycles of a clock on second clock path 502.

In some embodiments, the set of one or more predetermined values being matched against by second circuitry 520 may be a set of USB 3.0-compliant skip ordered set values, or a set of USB 3.1-compliant skip ordered set values. Second circuitry 520 may match against an identifying symbol followed by a predetermined number of skip symbols (e.g., one skip symbol, two skip symbols, or three skip symbols). For some embodiments, the set of one or more predetermined values being matched against by third circuitry 530 may be a set of USB 3.0-compliant skip ordered set values, or a set of USB 3.1-compliant skip ordered set values. Third circuitry 530 may match against an identifying symbol followed by a predetermined number of skip symbols (e.g., one skip symbol, two skip symbols, or three skip symbols).

Fourth circuitry 540 may comprise a first flag input coupled to first flag 525, a second flag input coupled to second flag 535, a clock input coupled to second clock path 502. Fourth circuitry 540 may be operable to begin incrementing a count value upon assertion of first flag 525 and to stop incrementing the count value upon assertion of second flag 535. In some embodiments, fourth circuitry 540 may comprise a count value output that may be coupled to a delay count 545 and may be operable to carry the count value.

In some embodiments, retimer portion 500 may comprise a recovery circuitry 592 coupled to serial-data path 591 and first clock path 501. The recovery circuitry may be operable to establish a recovered clock based on a serial-data stream on serial-data path 591, and may be operable to pass the recovered clock onto first clock path 501. For some embodiments, recovery circuitry 592 may also be coupled to first data path 501, and may be operable to extract a sampled data from serial-data path 591 and pass the sampled data onto first data path 501.

In some embodiments, retimer portion 500 may also comprise a fifth circuitry 550, a sixth circuitry 560, and/or a seventh circuitry 570. Fifth circuitry 550 may be operable to extract a first timestamp from a packet. Sixth circuitry 560 may be operable to determine a second timestamp based upon a sum of the first timestamp and the count value. Seventh circuitry 570 may be operable to substitute the second timestamp for the first timestamp within the packet. For some such embodiments, the packet may be one of a USB 3.0-compliant and/or USB 3.1-compliant ITP Link Management Packet (LMP), or a USB 3.0-compliant and/or USB 3.1-compliant LDM Response LMP.

Fifth circuitry 550, sixth circuitry 560, and/or seventh circuitry 570 may be portions of a block/packet/line-code component of a retimer, such as block/packet/line-code component 135. In some embodiments, a retimer incorporating retimer portion 500 may accordingly determine if received data includes an ITP packet or LDM packet bearing a timestamp. For some embodiments, if an ITP packet or LDM packet is detected, the retimer incorporating retimer portion 500 may add a measured elastic buffer delay to the timestamp. In some embodiments, a constant part of a delay from input to output may be calibrated, and may be estimated based upon implementation parameters.

In some alternate embodiments, first circuitry 510 may comprise an elastic buffer circuitry having a write-clock input coupled to a recovered clock, a write-data input coupled to a stream of recovered-clock data, a read-clock input coupled to a local clock, and a read-data output coupled to a stream of local-clock data. The recovered clock may be carried by first clock path 501, the stream of recovered-clock data may be carried by first data path 505, the local clock may be carried by a second clock path 502, and second data path 515 may carry the stream of local-clock data.

In the alternate embodiments, second circuitry 520 may comprise a first flag circuitry operable to assert a recovered-clock flag signal when a set of one or more values on the recovered-clock data matches part of a set of skip-ordered-set values over a corresponding set of cycles of the recovered-clock. First flag 525 may carry the recovered-clock flag signal.

For the alternate embodiments, third circuitry 530 may comprise a second flag circuitry operable to assert a local-clock flag signal when a set of one or more values on the local-clock data matches part of the set of skip-ordered-set values over a corresponding set of cycles of the local-clock. Second flag 535 may carry the local-clock flag signal.

In some such alternative embodiments, the set of skip-ordered-set values being matched against by the first flag circuitry may be a set of USB 3.0-compliant skip ordered set values, or a set of USB 3.1-compliant skip ordered set values. For some such alternative embodiments, the set of skip-ordered-set values being matched against by the second flag circuitry may be a set of USB 3.0-compliant skip ordered set values, or a set of USB 3.1-compliant skip ordered set values.

In the alternate embodiments, fourth circuitry 540 may comprise a counter circuitry operable to increment a count value with cycles of the local-clock. The counter circuitry may be operable to reset the count value and start incrementing the count value upon assertion of the recovered-clock flag signal, and the counter circuitry may be operable to stop incrementing upon assertion of the local-clock flag.

For the alternate embodiments, retimer portion 500 may comprise a clock recovery circuitry having a serial-data input. The clock recovery circuitry may be operable to establish the recovered-clock based on a stream of serial data carried on the serial-data input. In some such embodiments, the clock recovery circuitry may be operable to extract the recovered-clock data based on the serial-data input.

In the alternate embodiments, retimer portion 500 may comprise a timestamp modification circuitry operable to extract a first timestamp from a packet, to determine a second timestamp based upon a sum of the first timestamp and the count value, and to substitute the second timestamp for the first timestamp within the packet. For some such embodiments, the packet may be one of a USB 3.0-compliant and/or USB 3.1-compliant ITP LMP, or a USB 3.0-compliant and/or USB 3.1-compliant LDM Response LMP.

For the alternate embodiments, the elastic buffer circuitry, the first flag circuitry, and the second flag circuitry may correspond to a first lane of a multiple-lane serial-data interface, and the retimer component may additionally comprise another elastic buffer circuitry, another first flag circuitry, and another second flag circuitry that all correspond to a second lane of the multiple-lane interface.

Figure 6:
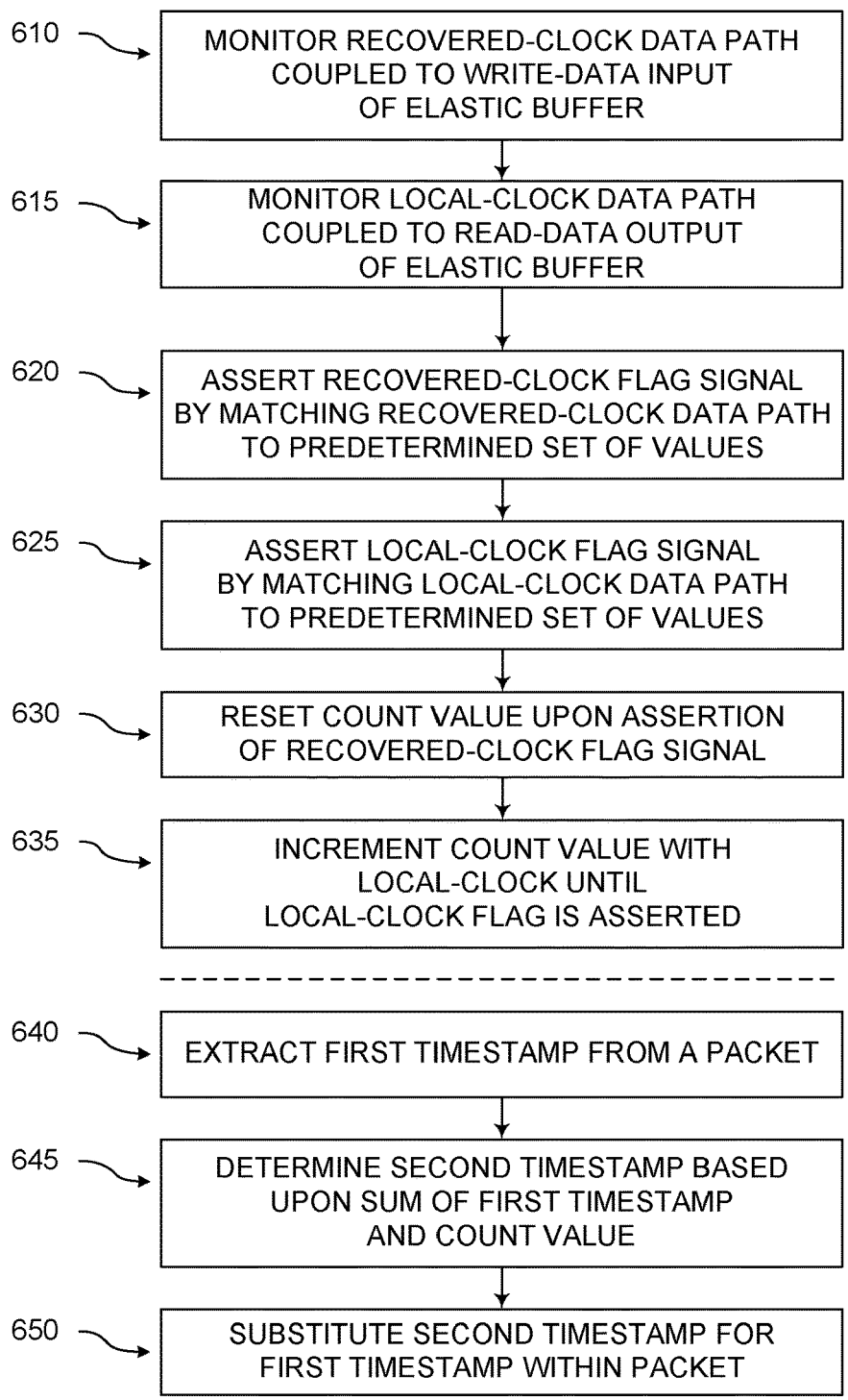
FIG. 6 illustrates a method of operation for a retimer capable of real-time delay measurement, in accordance with some embodiments of the disclosure.

FIG. 6 illustrates a method of operation for a retimer capable of real-time delay measurement, in accordance with some embodiments of the disclosure. A method 600 may comprise a monitoring 610, a monitoring 615, an asserting 620, an asserting 625, a resetting 630, and/or an incrementing 635. In various embodiments, method 600 may also comprise an extracting 640, a determining 645, and/or a substituting 650.

In monitoring 610, a recovered-clock data path coupled to a write-data input of an elastic buffer may be monitored. In monitoring 615, a local-clock data path coupled to a read-data output of the elastic buffer may be monitored.

In asserting 620, a recovered-clock flag signal may be asserted when a set of one or more values on the recovered-clock data path match a portion of a predetermined set of values over a corresponding set of cycles of a recovered-clock signal on a recovered-clock path coupled to the elastic buffer. In asserting 625, a local-clock flag signal may be asserted when a set of one or more values on the local-clock data path match a portion of the predetermined set of values over a corresponding set of cycles of a local-clock signal on a local-clock data path coupled to the elastic buffer. In some embodiments, the set of skip-ordered set values may be a set of USB 3.0-compliant skip ordered set values, or a set of USB 3.1-compliant skip ordered set values.

In resetting 630, a count value may be reset upon assertion of the recovered-clock flag signal. In incrementing 635, the count value may be incremented with cycles of the local-clock signal after resetting the count value and until the local-clock flag signal is asserted.

In extracting 640, a first timestamp may be extracted from a packet. In determining 645, a second timestamp may be determined based upon a sum of the first timestamp and the count value. In substituting 650, the second timestamp may be substituted for the first timestamp within the packet. In some embodiments, the packet may be one of a USB 3.0-compliant and/or USB 3.1-compliant ITP LMP, or a USB 3.0-compliant and/or USB 3.1-compliant LDM Response LMP.

Although the actions in the flowchart with reference to FIG. 6 are shown in a particular order, the order of the actions can be modified. Thus, the illustrated embodiments can be performed in a different order, and some actions may be performed in parallel. Some of the actions and/or operations listed in FIG. 6 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause one or more processors to perform an operation comprising method 600. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 7:
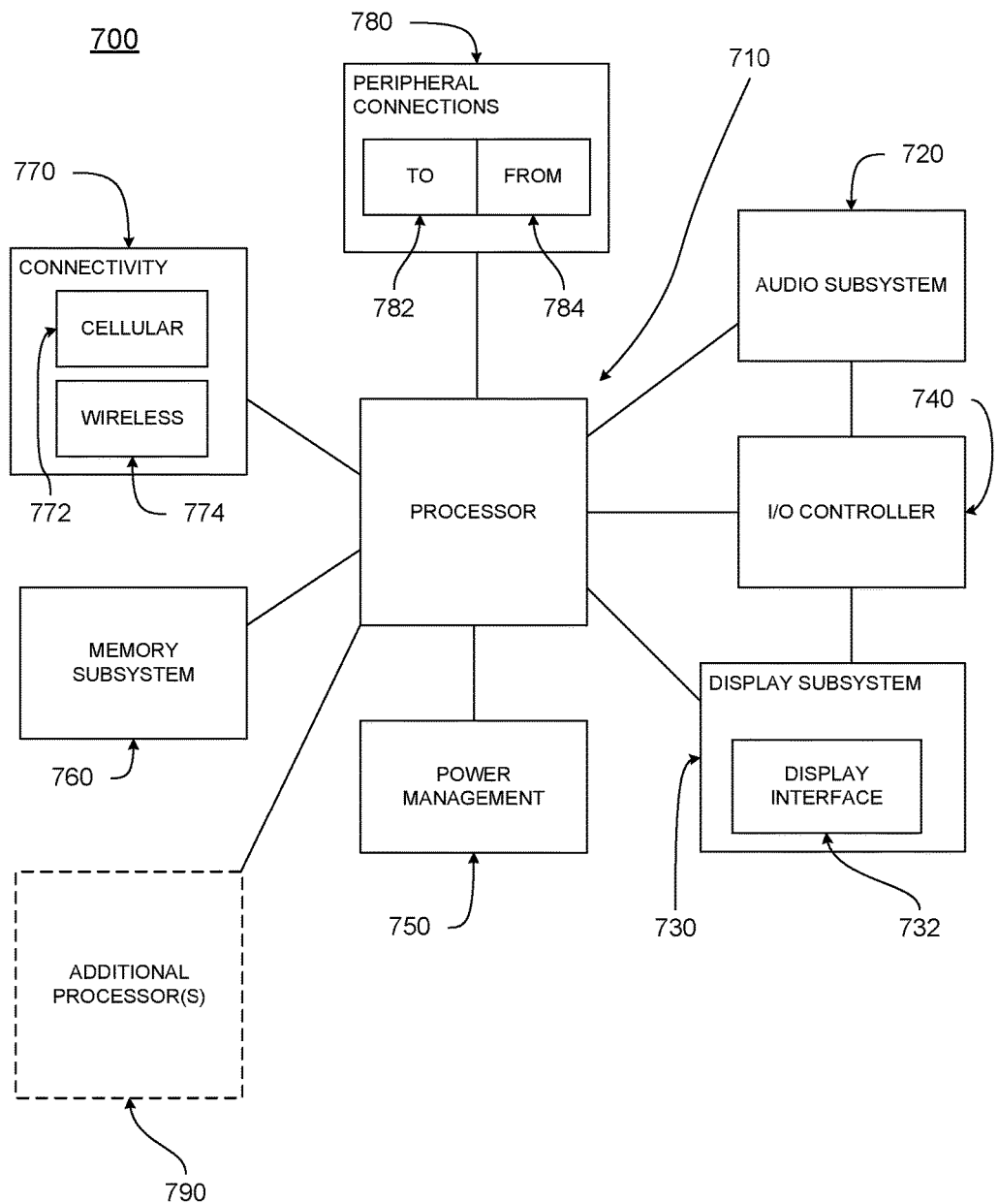
FIG. 7 illustrates a computing device with a retimer comprising circuitry for real-time delay measurement, in accordance with some embodiments of the disclosure.

FIG. 7 illustrates a computing device with a retimer comprising circuitry for real-time delay measurement, in accordance with some embodiments of the disclosure. Computing device 700 may be a computer system, a System-on-a-Chip (SoC), a tablet, a mobile device, a smart device, or a smart phone with a retimer comprising circuitry for real-time delay measurement, in accordance with some embodiments of the disclosure. It will be understood that certain components of computing device 700 are shown generally, and not all components of such a device are shown FIG. 7. Moreover, while some of the components may be physically separate, others may be integrated within the same physical package, or even on the same physical silicon die. Accordingly, the separation between the various components as depicted in FIG. 7 may not be physical in some cases, but may instead be a functional separation. It is also pointed out that those elements of FIG. 7 having the same names or reference numbers as the elements of any other figure can operate or function in any manner similar to that described, but are not limited to such.

In various embodiments, the components of computing device 700 may include any of a processor 710, an audio subsystem 720, a display subsystem 730, an I/O controller 740, a power management component 750, a memory subsystem 760, a connectivity component 770, one or more peripheral connections 780, and one or more additional processors 790. In some embodiments, processor 710 may include a retimer comprising circuitry for real-time delay measurement, in accordance with some embodiments of the disclosure. In various embodiments, however, any of the components of computing device 700 may include the retimer comprising circuitry for real-time delay measurement, in accordance with some embodiments of the disclosure.

In addition, one or more components of computing device 700 may include an interconnect fabric having a plurality of ports, such as a router, a network of routers, or a Network-on-a-Chip (NoC).

In some embodiments, computing device 700 may be a mobile device which may be operable to use flat surface interface connectors. In one embodiment, computing device 700 may be a mobile computing device, such as a computing tablet, a mobile phone or smart-phone, a wireless-enabled e-reader, or other wireless mobile device. The various embodiments of the present disclosure may also comprise a network interface within 770 such as a wireless interface so that a system embodiment may be incorporated into a wireless device, for example a cell phone or personal digital assistant.

Processor 710 may be a general-purpose processor or CPU (Central Processing Unit). In some embodiments, processor 710 may include one or more physical devices, such as microprocessors, application processors, microcontrollers, programmable logic devices, or other processing means. The processing operations performed by processor 710 may include the execution of an operating platform or operating system on which applications and/or device functions may then be executed. The processing operations may also include operations related to one or more of the following: audio I/O; display I/O; power management; connecting computing device 700 to another device; and/or I/O (input/output) with a human user or with other devices.

Audio subsystem 720 may include hardware components (e.g., audio hardware and audio circuits) and software components (e.g., drivers and/or codecs) associated with providing audio functions to computing device 700. Audio functions can include speaker and/or headphone output as well as microphone input. Devices for such functions can be integrated into computing device 700, or connected to computing device 700. In one embodiment, a user interacts with computing device 700 by providing audio commands that are received and processed by processor 710.

Display subsystem 730 may include hardware components (e.g., display devices) and software components (e.g., drivers) that provide a visual and/or tactile display for a user to interact with computing device 700. Display subsystem 730 may include a display interface 732, which may be a particular screen or hardware device used to provide a display to a user. In one embodiment, display interface 732 includes logic separate from processor 710 to perform at least some processing related to the display. In some embodiments, display subsystem 730 includes a touch screen (or touch pad) device that provides both output and input to a user.

I/O controller 740 may include hardware devices and software components related to interaction with a user. I/O controller 740 may be operable to manage hardware that is part of audio subsystem 720 and/or display subsystem 730. Additionally, I/O controller 740 may be a connection point for additional devices that connect to computing device 700, through which a user might interact with the system. For example, devices that can be attached to computing device 700 might include microphone devices, speaker or stereo systems, video systems or other display devices, keyboard or keypad devices, or other I/O devices for use with specific applications such as card readers or other devices.

As mentioned above, I/O controller 740 can interact with audio subsystem 720 and/or display subsystem 730. For example, input through a microphone or other audio device can provide input or commands for one or more applications or functions of computing device 700. Additionally, audio output can be provided instead of, or in addition to, display output. In another example, if display subsystem 730 includes a touch screen, the display device may also act as an input device, which can be at least partially managed by I/O controller 740. There can also be additional buttons or switches on computing device 700 to provide I/O functions managed by I/O controller 740.

In some embodiments, I/O controller 740 manages devices such as accelerometers, cameras, light sensors or other environmental sensors, or other hardware that can be included in computing device 700. The input can be part of direct user interaction, and may provide environmental input to the system to influence its operations (such as filtering for noise, adjusting displays for brightness detection, applying a flash for a camera, or other features).

Power management component 750 may include hardware components (e.g., power management devices and/or circuitry) and software components (e.g., drivers and/or firmware) associated with managing battery power usage, battery charging, and features related to power saving operation.

Memory subsystem 760 may include one or more memory devices for storing information in computing device 700. Memory subsystem 760 can include nonvolatile memory devices (whose state does not change if power to the memory device is interrupted) and/or volatile memory devices (whose state is indeterminate if power to the memory device is interrupted). Memory subsystem 760 can store application data, user data, music, photos, documents, or other data, as well as system data (whether long-term or temporary) related to the execution of the applications and functions of computing device 700.

Some portion of memory subsystem 760 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 770 may include a network interface, such as a cellular interface 772 or a wireless interface 774 (so that an embodiment of computing device 700 may be incorporated into a wireless device such as a cellular phone or a personal digital assistant). In some embodiments, connectivity component 770 includes hardware devices (e.g., wireless and/or wired connectors and communication hardware) and software components (e.g., drivers and/or protocol stacks) to enable computing device 700 to communicate with external devices. Computing device 700 could include separate devices, such as other computing devices, wireless access points or base stations, as well as peripherals such as headsets, printers, or other devices.

In some embodiments, connectivity component 770 can include multiple different types of network interfaces, such as one or more wireless interfaces for allowing processor 710 to communicate with another device. To generalize, computing device 700 is illustrated with cellular interface 772 and wireless interface 774. Cellular interface 772 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 774 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 780 may include hardware interfaces and connectors, as well as software components (e.g., drivers and/or protocol stacks) to make peripheral connections. It will be understood that computing device 700 could both be a peripheral device to other computing devices (via "to" 782), as well as have peripheral devices connected to it (via "from" 784). The computing device 700 may have a "docking" connector to connect to other computing devices for purposes such as managing content on computing device 700 (e.g., downloading and/or uploading, changing, synchronizing). Additionally, a docking connector can allow computing device 700 to connect to certain peripherals that allow computing device 700 to control content output, for example, to audiovisual or other systems.

In addition to a proprietary docking connector or other proprietary connection hardware, computing device 700 can make peripheral connections 780 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

An example provides an apparatus comprising: a first circuitry comprising a data input coupled to a first data path, a data output coupled to a second data path, a write-clock input coupled to a first clock path, and a read-clock input coupled to a second clock path; a second circuitry to assert a first flag when a set of one or more values on the first data path matches a portion of set of one or more predetermined values over a corresponding set of one or more cycles of a clock on the first clock path; a third circuitry to assert a second flag when a set of one or more values on the second data path matches a portion of the set of one or more predetermined values over a corresponding set of one or more cycles of a clock on the second clock path; and a fourth circuitry to begin incrementing a count value upon assertion of a first flag input coupled to the first flag and to stop incrementing the count value upon assertion of a second flag input coupled to the second flag.

Some embodiments provide an apparatus wherein the first circuitry comprises an elastic buffer.

Some embodiments provide an apparatus comprising: a recovery circuitry coupled to a serial-data path and the first clock path, wherein the recovery circuitry is to establish a recovered clock based on a serial-data stream on the serial-data path and pass the recovered clock onto the first clock path.

Some embodiments provide an apparatus wherein the recovery circuitry is coupled to the first data path, and wherein the fifth circuitry is to extract a sampled data from the serial-data path and pass the sampled data onto the first data path.

Some embodiments provide an apparatus wherein the set of one or more predetermined values is one of: a set of Universal Serial Bus (USB) 3.0-compliant skip ordered set values, or a set of USB 3.1-compliant skip ordered set values.

Some embodiments provide an apparatus wherein the fourth circuitry comprises a count value output to carry the count value.

Some embodiments provide an apparatus comprising: a fifth circuitry to extract a first timestamp from a packet; and a sixth circuitry to determine a second timestamp based upon a sum of the first timestamp and the count value; and a seventh circuitry to substitute the second timestamp for the first timestamp within the packet.

Some embodiments provide an apparatus wherein the packet is one of: a Universal Serial Bus (USB) 3.0-compliant and/or USB 3.1-compliant Isochronous Timestamp Packet (ITP) Link Management Packet (LMP), or a USB 3.0-compliant and/or USB 3.1-compliant Link Delay Measurement (LDM) Response LMP.

Some embodiments provide an apparatus wherein the second circuitry comprises a logic to synchronize the first flag to a clock domain of the second clock path.

An example provides a system comprising a memory, a processor coupled to the memory, and a wireless interface for allowing the processor to communicate with another device, the system including various of the above apparatus.

A retimer component comprising: an elastic buffer circuitry comprising a write-clock input coupled to a recovered-clock path, a write-data input coupled to a recovered-clock data path, a read-clock input coupled to a local-clock path, and a read-data output coupled to a local-clock data path; a first flag circuitry to assert a recovered-clock flag signal when a set of one or more values on the recovered-clock data path matches part of a set of skip-ordered-set values over a corresponding set of cycles of a recovered-clock signal on the recovered-clock path; a second flag circuitry to assert a local-clock flag signal when a set of one or more values on the local-clock data path matches part of the set of skip-ordered-set values over a corresponding set of cycles of a local-clock signal on the local-clock path; and a counter circuitry to increment a count value with cycles of a local-clock signal on the local-clock path, wherein the counter circuitry is to reset the count value and start incrementing upon assertion of the recovered-clock flag signal; and wherein the counter circuitry is to stop incrementing upon assertion of the local-clock flag signal.

Some embodiments provide a retimer component comprising: a clock recovery circuitry comprising a serial-data input, wherein the clock recovery circuitry is to establish the recovered-clock signal based on the serial-data input.

Some embodiments provide a retimer component wherein the clock recovery circuitry is to extract a recovered-clock data signal based on the serial-data input, and to pass the recovered-clock data signal onto the recovered-clock data path.

Some embodiments provide a retimer component wherein the set of skip-ordered set values is one of: a set of Universal Serial Bus (USB) 3.0-compliant skip ordered set values, or a set of USB 3.1-compliant skip ordered set values.

Some embodiments provide a retimer component comprising: a timestamp modification circuitry to extract a first timestamp from a packet, to determine a second timestamp based upon a sum of the first timestamp and the count value, and to substitute the second timestamp for the first timestamp within the packet.

Some embodiments provide a retimer component wherein the packet is one of: a Universal Serial Bus (USB) 3.0-compliant and/or USB 3.1-compliant Isochronous Timestamp Packet (ITP) Link Management Packet (LMP), or a USB 3.0-compliant and/or USB 3.1-compliant Link Delay Measurement (LDM) Response LMP.

Some embodiments provide a retimer component wherein the elastic buffer circuitry, the first flag circuitry, and the second flag circuitry correspond to a first lane of a multiple-lane serial-data interface, and the retimer component comprises another elastic buffer circuitry, another first flag circuitry, and another second flag circuitry that all correspond to a second lane of the multiple-lane interface.

An example provides a system comprising a memory, a processor coupled to the memory, and a wireless interface for allowing the processor to communicate with another device, the system including various of the above the retimer component.

An example provides a system comprising a memory, a processor coupled to the memory, and a wireless interface for allowing the processor to communicate with another device, the processor including: a first circuitry comprising a data input coupled to a first data path, a data output coupled to a second data path, a write-clock input coupled to a first clock path, and a read-clock input coupled to a second clock path; a second circuitry to assert a first flag when a set of one or more values on the first data path matches a portion of a set of one or more predetermined values over a corresponding set of one or more cycles of a clock on the first clock path; a third circuitry to assert a second flag when a set of one or more values on the second data path matches a portion of the set of one or more predetermined values over a corresponding set of one or more cycles of a clock on the second clock path; and a fourth circuitry to begin incrementing a count value upon assertion of a first flag input coupled to the first flag and to stop incrementing the count value upon assertion of a second flag input coupled to the second flag.

Some embodiments provide a system wherein the set of one or more predetermined values is one of: a set of Universal Serial Bus (USB) 3.0-compliant skip ordered set values, or a set of USB 3.1-compliant skip ordered set values.

Some embodiments provide a system comprising: a fifth circuitry to extract a first timestamp from a packet; a sixth circuitry to determine a second timestamp based upon a sum of the first timestamp and the count value; and a seventh circuitry to substitute the second timestamp for the first timestamp within the packet.

Some embodiments provide a system wherein the packet is one of: a Universal Serial Bus (USB) 3.0-compliant and/or USB 3.1-compliant Isochronous Timestamp Packet (ITP) Link Management Packet (LMP), or a USB 3.0-compliant and/or USB 3.1-compliant Link Delay Measurement (LDM) Response LMP.

An example provides a method comprising: monitoring a recovered-clock data path coupled to a write-data input of an elastic buffer; monitoring a local-clock data path coupled to a read-data output of the elastic buffer; asserting a recovered-clock flag signal when a set of one or more values on the recovered-clock data path match a portion of a predetermined set of values over a corresponding set of cycles of a recovered-clock signal on a recovered-clock path coupled to the elastic buffer; asserting a local-clock flag signal when a set of one or more values on the local-clock data path match a portion of the predetermined set of values over a corresponding set of cycles of a local-clock signal on a local-clock data path coupled to the elastic buffer; resetting a count value upon assertion of the recovered-clock flag signal; and incrementing the count value with cycles of the local-clock signal after resetting the count value and until the local-clock flag signal is asserted.

Some embodiments provide a method wherein the set of skip-ordered set values is one of: a set of Universal Serial Bus (USB) 3.0-compliant skip ordered set values, or a set of USB 3.1-compliant skip ordered set values.

Some embodiments provide a method comprising: extracting a first timestamp from a packet; determining a second timestamp based upon a sum of the first timestamp and the count value; and substituting the second timestamp for the first timestamp within the packet.

Some embodiments provide a method wherein the packet is one of: a Universal Serial Bus (USB) 3.0-compliant and/or USB 3.1-compliant Isochronous Timestamp Packet (ITP) Link Management Packet (LMP), or a USB 3.0-compliant and/or USB 3.1-compliant Link Delay Measurement (LDM) Response LMP.

An example provides a machine readable storage medium having machine executable instructions stored thereon that, when executed, cause one or more processors to perform a method according to various of the examples above.

An example provides an apparatus comprising: means for monitoring a recovered-clock data path coupled to a write-data input of an elastic buffer; means for monitoring a local-clock data path coupled to a read-data output of the elastic buffer; means for asserting a recovered-clock flag signal when a set of one or more values on the recovered-clock data path match a portion of a predetermined set of values over a corresponding set of cycles of a recovered-clock signal on a recovered-clock path coupled to the elastic buffer; means for asserting a local-clock flag signal when a set of one or more values on the local-clock data path match a portion of the predetermined set of values over a corresponding set of cycles of a local-clock signal on a local-clock data path coupled to the elastic buffer; means for resetting a count value upon assertion of the recovered-clock flag signal; and means for incrementing the count value with cycles of the local-clock signal after resetting the count value and until the local-clock flag signal is asserted.

Some embodiments provide an apparatus wherein the set of skip-ordered set values is one of: a set of Universal Serial Bus (USB) 3.0-compliant skip ordered set values, or a set of USB 3.1-compliant skip ordered set values.

Some embodiments provide an apparatus comprising: means for extracting a first timestamp from a packet; means for determining a second timestamp based upon a sum of the first timestamp and the count value; and means for substituting the second timestamp for the first timestamp within the packet.

Some embodiments provide an apparatus wherein the packet is one of: a Universal Serial Bus (USB) 3.0-compliant and/or USB 3.1-compliant Isochronous Timestamp Packet (ITP) Link Management Packet (LMP), or a USB 3.0-compliant and/or USB 3.1-compliant Link Delay Measurement (LDM) Response LMP.

An example provides a machine readable storage medium having machine executable instructions stored thereon that, when executed, cause one or more processors to perform an operation comprising: monitoring a recovered-clock data path coupled to a write-data input of an elastic buffer; monitoring a local-clock data path coupled to a read-data output of the elastic buffer; asserting a recovered-clock flag signal when a set of one or more values on the recovered-clock data path match a portion of a predetermined set of values over a corresponding set of cycles of a recovered-clock signal on a recovered-clock path coupled to the elastic buffer; asserting a local-clock flag signal when a set of one or more values on the local-clock data path match a portion of the predetermined set of values over a corresponding set of cycles of a local-clock signal on a local-clock data path coupled to the elastic buffer; resetting a count value upon assertion of the recovered-clock flag signal; and incrementing the count value with cycles of the local-clock signal after resetting the count value and until the local-clock flag signal is asserted.

Some embodiments provide a machine readable storage medium wherein the set of skip-ordered set values is one of: a set of Universal Serial Bus (USB) 3.0-compliant skip ordered set values, or a set of USB 3.1-compliant skip ordered set values.

Some embodiments provide a machine readable storage medium the operation comprising: extracting a first timestamp from a packet; determining a second timestamp based upon a sum of the first timestamp and the count value; and substituting the second timestamp for the first timestamp within the packet.

Some embodiments provide a machine readable storage medium wherein the packet is one of: a Universal Serial Bus (USB) 3.0-compliant and/or USB 3.1-compliant Isochronous Timestamp Packet (ITP) Link Management Packet (LMP), or a USB 3.0-compliant and/or USB 3.1-compliant Link Delay Measurement (LDM) Response LMP.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
   a first circuitry comprising a data input coupled to a first data path, a data output coupled to a second data path, a write-clock input coupled to a first clock path, and a read-clock input coupled to a second clock path;
   a second circuitry to assert a first flag when a set of one or more values on the first data path matches a portion of set of one or more predetermined values over a corresponding set of one or more cycles of a clock on the first clock path;
   a third circuitry to assert a second flag when a set of one or more values on the second data path matches a portion of the set of one or more predetermined values over a corresponding set of one or more cycles of a clock on the second clock path; and
   a fourth circuitry to begin incrementing a count value upon assertion of a first flag input coupled to the first flag and to stop incrementing the count value upon assertion of a second flag input coupled to the second flag.

2. The apparatus of claim 1, wherein the first circuitry comprises an elastic buffer.

3. The apparatus of claim 1, comprising:
   a recovery circuitry coupled to a serial-data path and the first clock path,
   wherein the recovery circuitry is to establish a recovered clock based on a serial-data stream on the serial-data path and pass the recovered clock onto the first clock path.

4. The apparatus of claim 3, wherein the recovery circuitry is coupled to the first data path, and wherein the fifth circuitry is to extract a sampled data from the serial-data path and pass the sampled data onto the first data path.

5. The apparatus of claim 1, wherein the set of one or more predetermined values is one of: a set of Universal Serial Bus (USB) 3.0-compliant skip ordered set values, or a set of USB 3.1-compliant skip ordered set values.

6. The apparatus of claim 1, wherein the fourth circuitry comprises a count value output to carry the count value.

7. The apparatus of claim 6, comprising:
   a fifth circuitry to extract a first timestamp from a packet; and
   a sixth circuitry to determine a second timestamp based upon a sum of the first timestamp and the count value; and
   a seventh circuitry to substitute the second timestamp for the first timestamp within the packet.

8. The apparatus of claim 7, wherein the packet is one of: a Universal Serial Bus (USB) 3.0-compliant and/or USB 3.1-compliant Isochronous Timestamp Packet (ITP) Link Management Packet (LMP), or a USB 3.0-compliant and/or USB 3.1-compliant Link Delay Measurement (LDM) Response LMP.

9. The apparatus of claim 1, wherein the second circuitry comprises a logic to synchronize the first flag to a clock domain of the second clock path.

10. A retimer component comprising:
    an elastic buffer circuitry comprising a write-clock input coupled to a recovered-clock path, a write-data input coupled to a recovered-clock data path, a read-clock input coupled to a local-clock path, and a read-data output coupled to a local-clock data path;
    a first flag circuitry to assert a recovered-clock flag signal when a set of one or more values on the recovered-clock data path matches part of a set of skip-ordered-set values over a corresponding set of cycles of a recovered-clock signal on the recovered-clock path;
    a second flag circuitry to assert a local-clock flag signal when a set of one or more values on the local-clock data path matches part of the set of skip-ordered-set values over a corresponding set of cycles of a local-clock signal on the local-clock path; and
    a counter circuitry to increment a count value with cycles of a local-clock signal on the local-clock path,
    wherein the counter circuitry is to reset the count value and start incrementing upon assertion of the recovered-clock flag signal; and
    wherein the counter circuitry is to stop incrementing upon assertion of the local-clock flag signal.

11. The retimer component of claim 10, comprising:
    a clock recovery circuitry comprising a serial-data input, wherein the clock recovery circuitry is to establish the recovered-clock signal based on the serial-data input.

12. The retimer component of claim 11, wherein the clock recovery circuitry is to extract a recovered-clock data signal based on the serial-data input, and to pass the recovered-clock data signal onto the recovered-clock data path.

13. The retimer component of claim 10, wherein the set of skip-ordered set values is one of: a set of Universal Serial Bus (USB) 3.0-compliant skip ordered set values, or a set of USB 3.1-compliant skip ordered set values.

14. The retimer component of claim 10, comprising:
    a timestamp modification circuitry to extract a first timestamp from a packet, to determine a second timestamp based upon a sum of the first timestamp and the count value, and to substitute the second timestamp for the first timestamp within the packet.

15. The retimer component of claim 14, wherein the packet is one of: a Universal Serial Bus (USB) 3.0-compliant and/or USB 3.1-compliant Isochronous Timestamp Packet (ITP) Link Management Packet (LMP), or a USB 3.0-compliant and/or USB 3.1-compliant Link Delay Measurement (LDM) Response LMP.

16. The retimer component of claim 10, wherein the elastic buffer circuitry, the first flag circuitry, and the second flag circuitry correspond to a first lane of a multiple-lane serial-data interface, and the retimer component comprises another elastic buffer circuitry, another first flag circuitry, and another second flag circuitry that all correspond to a second lane of the multiple-lane interface.

17. A system comprising a memory, a processor coupled to the memory, and a wireless interface for allowing the processor to communicate with another device, the processor including:
  a first circuitry comprising a data input coupled to a first data path, a data output coupled to a second data path, a write-clock input coupled to a first clock path, and a read-clock input coupled to a second clock path;
  a second circuitry to assert a first flag when a set of one or more values on the first data path matches a portion of a set of one or more predetermined values over a corresponding set of one or more cycles of a clock on the first clock path;
  a third circuitry to assert a second flag when a set of one or more values on the second data path matches a portion of the set of one or more predetermined values over a corresponding set of one or more cycles of a clock on the second clock path; and
  a fourth circuitry to begin incrementing a count value upon assertion of a first flag input coupled to the first flag and to stop incrementing the count value upon assertion of a second flag input coupled to the second flag.

18. The system of claim 17, wherein the set of one or more predetermined values is one of: a set of Universal Serial Bus (USB) 3.0-compliant skip ordered set values, or a set of USB 3.1-compliant skip ordered set values.

19. The system of claim 17, comprising:
  a fifth circuitry to extract a first timestamp from a packet;
  a sixth circuitry to determine a second timestamp based upon a sum of the first timestamp and the count value; and
  a seventh circuitry to substitute the second timestamp for the first timestamp within the packet.

20. The system of claim 17, wherein the packet is one of: a Universal Serial Bus (USB) 3.0-compliant and/or USB 3.1-compliant Isochronous Timestamp Packet (ITP) Link Management Packet (LMP), or a USB 3.0-compliant and/or USB 3.1-compliant Link Delay Measurement (LDM) Response LMP.

* * * * *